US005666357A

United States Patent [19]
Jangi

[11] Patent Number: 5,666,357
[45] Date of Patent: Sep. 9, 1997

[54] DTMF TONE PASSER IN A VOICE COMMUNICATION SYSTEM

[75] Inventor: Shrirang Jangi, Germantown, Md.

[73] Assignee: Hughes Electronics, Los Angeles, Calif.

[21] Appl. No.: 764,654

[22] Filed: Dec. 4, 1996

Related U.S. Application Data

[63] Continuation of Ser. No. 408,805, Mar. 23, 1995, abandoned.

[51] Int. Cl.$^6$ .................................................... H04J 3/12
[52] U.S. Cl. ........................ 370/345; 370/466; 370/473; 370/476; 370/525; 370/526; 455/466
[58] Field of Search ................................ 370/345, 465, 370/466, 473, 476, 522, 525, 526; 379/58, 59, 63

[56] References Cited

U.S. PATENT DOCUMENTS

| | | | |
|---|---|---|---|
| 4,677,656 | 6/1987 | Burke et al. | 379/63 |
| 5,121,391 | 6/1992 | Paneth et al. | 370/95.1 |
| 5,392,348 | 2/1995 | Park et al. | 370/110.3 |

*Primary Examiner*—Russell W. Blum
*Attorney, Agent, or Firm*—John T. Whelan; Wanda Denson-Low

[57] ABSTRACT

The present invention relates to a system and method for sending and receiving digital signals in a voice communication system. The system includes a data buffer, a tone detector, a speech encoder, and a transmitting unit. The data buffer receives and stores a digitized signal including voice band tone data and speech data. The tone detector detects the voice band tone data and generates at least one tone packet containing data indicative of the voice band tone data. The speech encoder encodes the speech data into a plurality of compressed speech packets. The transmitting unit in communication with the tone detector and the speech encoder transmits a packet message including tone packets and speech packets over an RF channel. The present invention also relates to a receiver including a speech decoder and a tone generator. The speech decoder decompresses speech packets to generate a digitized speech signal. The tone generator detects tone packets and generates a digitized DTMF tone signal from data contained in the tone packet. The present invention also relates to a method of encoding a digital signal. The method includes the steps of receiving the digital signal having a speech component and a digit component, detecting digit information from the digit component, generating a tone packet signal and a speech packet signal, and generating a digital output signal including the tone packet signal and the speech packet signal. The tone packet signal includes the digit information, and the speech packet signal is generated by compressing the speech component.

22 Claims, 4 Drawing Sheets

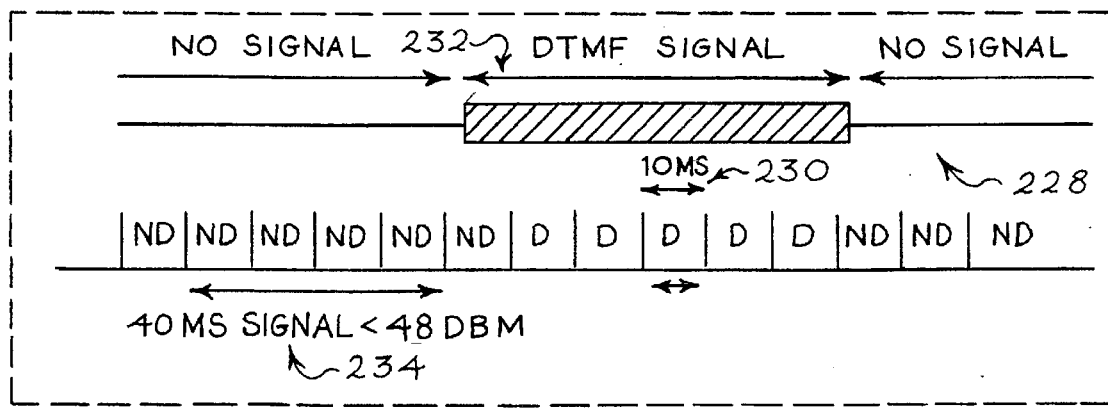
Fig. 7
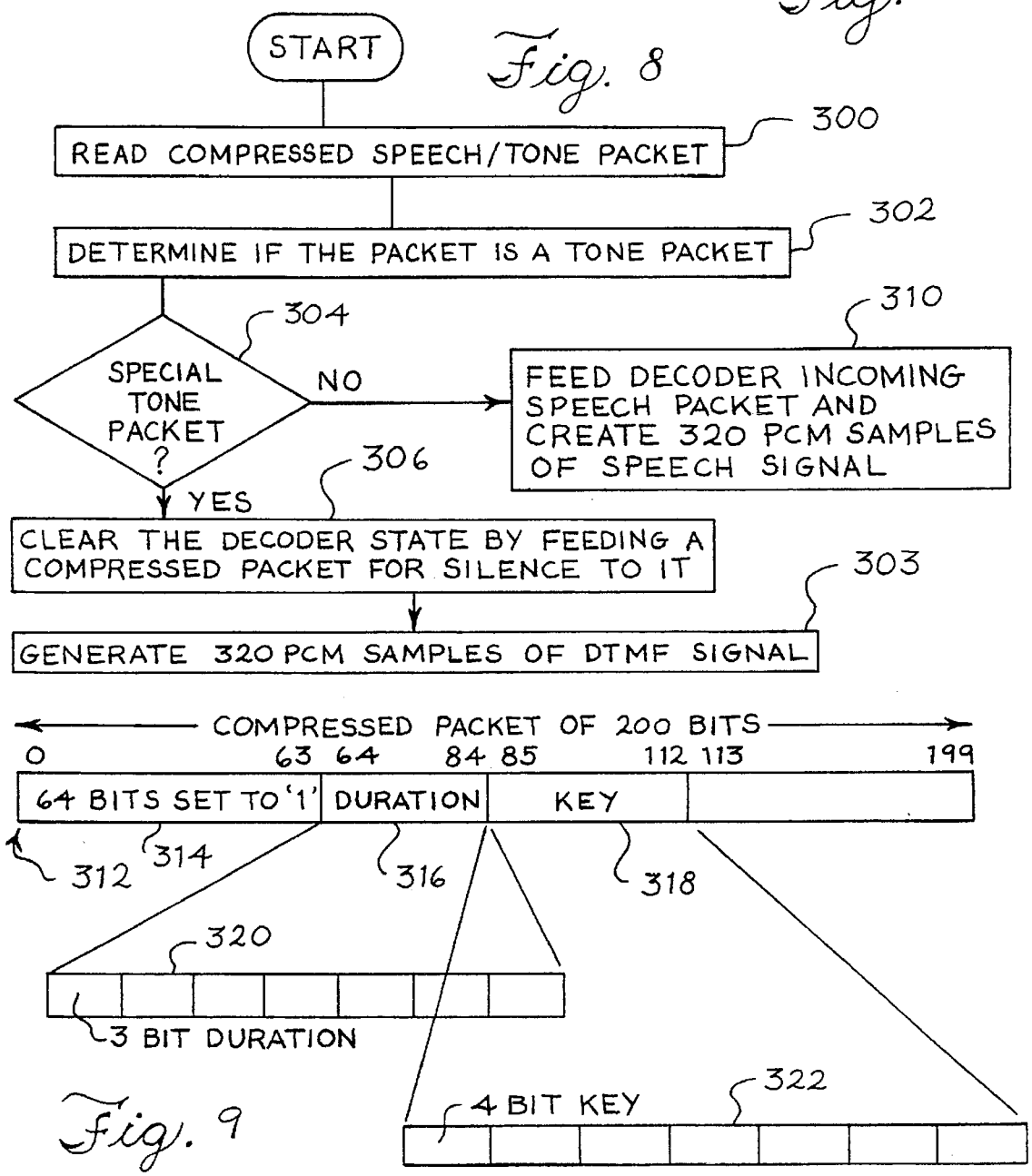
Fig. 8
Fig. 9

DTMF TONE PASSER IN A VOICE COMMUNICATION SYSTEM

This application is a Continuation of application Ser. No. 08/408,805 filed on Mar. 23, 1995, now abandoned.

BACKGROUND OF THE INVENTION

Conventional wireless communication system use encoders to reduce the amount of bandwidth required for the transmission of speech signals over the air. Typically, the encoder compresses the digitized speech signal into a packet signal having reduced bandwidth. Generally, the encoder analyzes speech signals and designates particular codes to represent particular characteristics in the digital signal. For example, fast changing sounds requiring more information and therefore receive a higher percentage of bits than slow changing sounds.

After compression by the encoder, compressed speech packets are subsequently transmitted through the air over an RF chapel to a base station unit, where the speech packets may be transmitted to another remote base station unit or decompressed and transmitted to a local telephone subscriber.

Although encoders may be used to reduce transmission bandwidth requirements by compressing digitized speech, the encoders may distort voice band tone data, such as dialed digit information, that may be present in the speech signal. Typically, dialed digit information is represented by dual tone multifrequency (DTMF) tones that are generated when a subscriber presses a key on a telephone keypad. Since conventional encoders are designed to compress speech data instead of tone data, compressing a speech signal containing DTMF tones may result in losing at least some of the dialed digit information.

One approach to address this problem has been used by conventional mobile telephone systems using an IS-54 mobile telephone. The IS-54 mobile telephone has a keypass that senses which key is pressed and then sends digit information for the pressed key to the base station unit over a communication channel that is separate from the voice chapel. Typically, the keypass information is transmitted over the control channel and the voice information is transmitted over a traffic channel. The IS-54 telephone also receives digit information over the separate communication channel.

However, there are many applications where a subscriber would rather use a conventional analog telephone instead of a mobile telephone for communication in a wireless system. One such application involves a wireless telephone system allowing a plurality of subscribers in a remote location to receive telephone service. In this application, a radio transmitting unit including an encoder is used to send speech and DTMF digit data over an RF channel to a base station unit that is coupled to a local office within the public telephone network. In such an application, many potential customers would rather use inexpensive traditional analog telephones than the more expensive IS-54 type mobile telephones. In addition, where the radio transmitting unit is physically separated from the subscriber touch tone keypad, a keypress detector similar to those used in IS-54 telephones will not operate correctly.

However, in such an application, a subscriber using a traditional analog telephone will probably not be able to send voice band tones, such as DTMF tones, after establishing a telephone call. The need to send DTMF tones generally arises when the subscriber is communicating with an automated touch tone based system, such as a bank account information system. Since DTMF tones sent by the subscriber's phone are encoded before being transmitted over the air to the base station unit, a DTMF detector at the automated touch tone system will have difficulty detecting the previously encoded DTMF digits.

Thus, it would be desirable to allow a subscriber to use an analog telephone to send voice band tone data instead of using an IS-54 type phone that sends a keypress signal in a wireless voice communication system. Such wireless voice communication systems include but are not limited to fixed wireless systems and airplane air to ground telephone system. Accordingly, there is a need for a wireless voice communication system supporting the use of analog telephones.

SUMMARY OF THE INVENTION

The present invention relates to an apparatus for sending and receiving digital signals in a voice communication system. The system includes a data buffer, a tone detector, a speech encoder, and a transmitting unit. The data buffer receives and stores a digitized signal including voice band tone data and speech data. The tone detector detects the voice band tone data and generates at least one tone packet containing data indicative of the voice band tone data. The speech encoder compresses the speech data into a plurality of compressed speech packets. The transmitting unit in communication with the tone detector and the speech encoder transmits a packet message including tone packets and compressed speech packets over an RF channel.

Preferably, the tone packet includes a header field, a duration field, and a key field. The header field may contain a distinguishable binary sequence. In the preferred embodiment, the voice band tone data is directed to DTMF digits. The duration field may include a plurality of duration combination subfields, and the key field may include a plurality of key subfields where at least one of the key subfields contains data indicative of the voice band tone data, such as a DTMF digit.

The present invention also relates to a receiver adapted to receive the packet message from the transmitting unit. The receiver includes a speech decoder and a tone generator. The speech decoder decompresses speech packets to reconstruct a digitized speech signal. The tone generator detects tone packets and generates a digitized DTMF tone signal from data contained in the tone packet.

The present invention also relates to a method of encoding a digital signal having a speech component and a digit component. The method includes the steps of receiving the digital signal, detecting digit information from the digit component, and generating a digital output signal including a tone packet signal and a speech packet signal. The tone packet signal includes digit information from the digit component, and the speech packet signal is a compressed signal encoded from the speech component. Preferably, the digital output signal is transmitted over a common communication channel such as an RF channel.

The present invention may also include the steps of receiving the digital output signal, recovering digit information from the tone packet signal, and decoding the speech packet signal to construct a digitized speech signal. Preferably, the method also generates a digitized tone signal, such as a DTMF signal, representative of the digit information. Finally, the method preferably generates a decompressed output signal from the digitized speech signal and the digitized tone signal.

The invention, together with further objects and attendant advantages, will best be understood by reference to the following detailed description, taken in conjunction with the accompanying drawings.

BRIEF DESCRIPTION OF THE DRAWINGS

FIG. 7 is a diagram illustrating a method of detecting a DTMF digit.

FIG. 8 is a flow chart illustrating a tone generation process according to a preferred embodiment of the invention.

FIG. 9 is a diagram illustrating a preferred embodiment of a tone packet message.

DETAILED DESCRIPTION OF THE PREFERRED EMBODIMENTS

Figure 1:
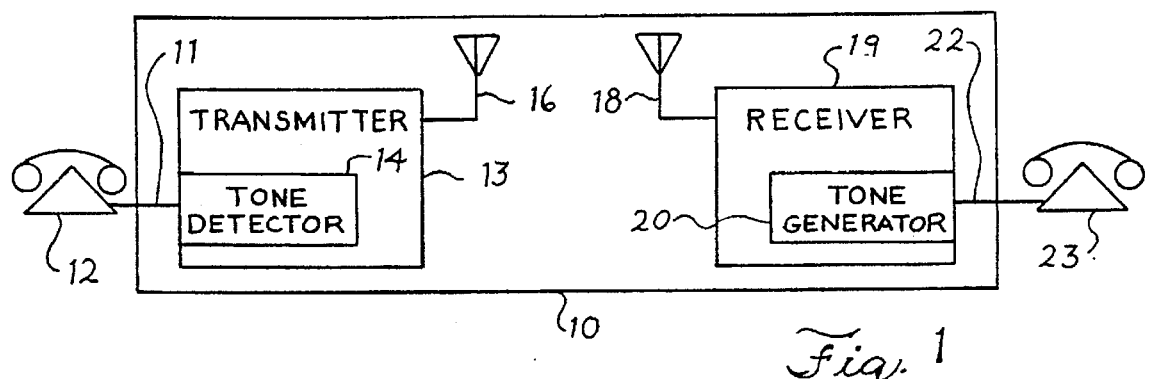
FIG. 1 is a block diagram of a voice communication that may be used with the present invention.

As shown in FIG. 1, a voice communication system 10 according to a preferred embodiment of the present invention includes a first subscriber analog telephone 12, a transmitter 13, a receiver 19 including a tone generator 20, and a second subscriber analog telephone 23. The transmitter 13 includes a tone detector 14, a first antenna 16, and a second antenna 18. In the preferred embodiment, the first subscriber analog telephone 12 is connected to the transmitter 13, and the second subscriber analog telephone 23 is connected to the receiver 19. The transmitter 13 receives an analog signal 11 carrying speech and DTMF signals from the first subscriber telephone 12. The transmitting unit 13 converts the analog speech signal into a digital speech signal. The tone detector 14 determines whether the digital speech signal contains any voice band tone data, preferably dialed digits such as dual tone multifrequency (DTMF) tones, and encodes any detected digits into special tone packets. The voice band tone data may also be facsimile tones or modem tones. The transmitting unit 13 compresses the digital speech signal, replaces compressed speech packets with any special tone packets from the tone detector 14 if necessary, and transmits a digitally modulated and compressed output signal using the antenna 16 via an RF transmission channel. The digitally compressed signal is received by the receiver 19 using the second antenna 18. The tone generator 20 recovers any special tone packets in the received signal and generates a corresponding tone signal to be sent to the second telephone subscriber 23. The receiver 19 decompresses the digital speech signal and converts the signal to an analog speech signal 22 that is sent to the second subscriber telephone 23.

Figure 2:
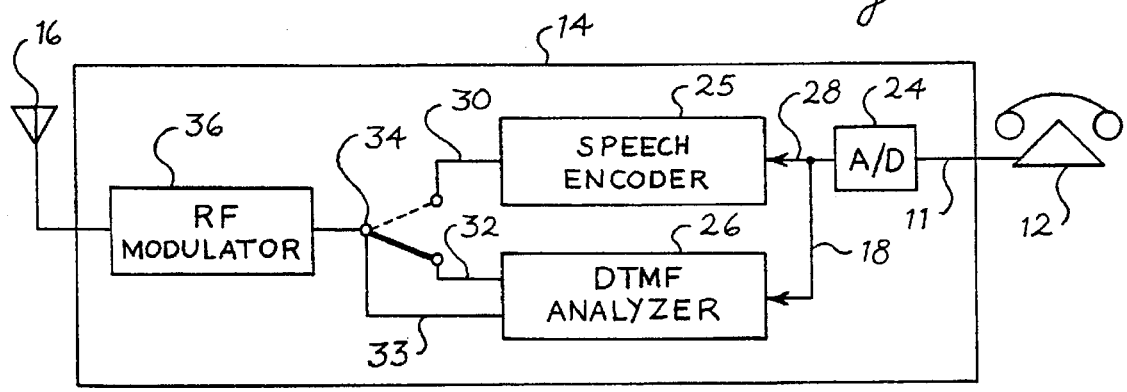
FIG. 2 is a block diagram of the tone detector of FIG. 1.

As shown in FIG. 2, a preferred embodiment of the tone detector 14 includes an A/D converter 24, a speech encoder 25, a DTMF analyzer 26, a switch 34, and an RF modulator 36. In the preferred embodiment, the A/D converter 24 is connected to the speech encoder 25 and to the DTMF analyzer 26. The switch 34 is connected to the speech encoder 25, the DTMF analyzer 26, and the RF modulator 36 which is connected to the antenna 16.

The A/D converter 24 receives the analog speech signal 11 from the telephone subscriber phone 12 and generates a digital pulse code modulated (PCM) signal 28. The PCM signal 28 is received by the speech encoder 25 and the DTMF analyzer 26. The speech encoder compresses the PCM signal 28 and generates a compressed speech packet signal 30. The DTMF analyzer 26 detects DTMF digits present in the PCM signal 28 and generates a tone packet signal 32. The tone packet signal preferably includes a plurality of special tone packets with each tone packet containing information indicative of the DTMF digit detected.

The DTMF analyzer 26 controls the switch 34 with a control signal 33. When the DTMF analyzer 26 detects a DTMF digit, the control signal 33 instructs the switch 34 to replace the compressed packet received from the speech encoder 25 with the special tone packet received from the DTMF analyzer 26. Thus, the output signal from the switch 34 is a packet message that contains both compressed speech packets interleaved with any special tone packets. The RF modulator 36 modulates the output signal from the switch 34 to an RF frequency suitable for transmission. The resulting modulated output signal is transmitted over the air using the antenna 16.

Figure 3:
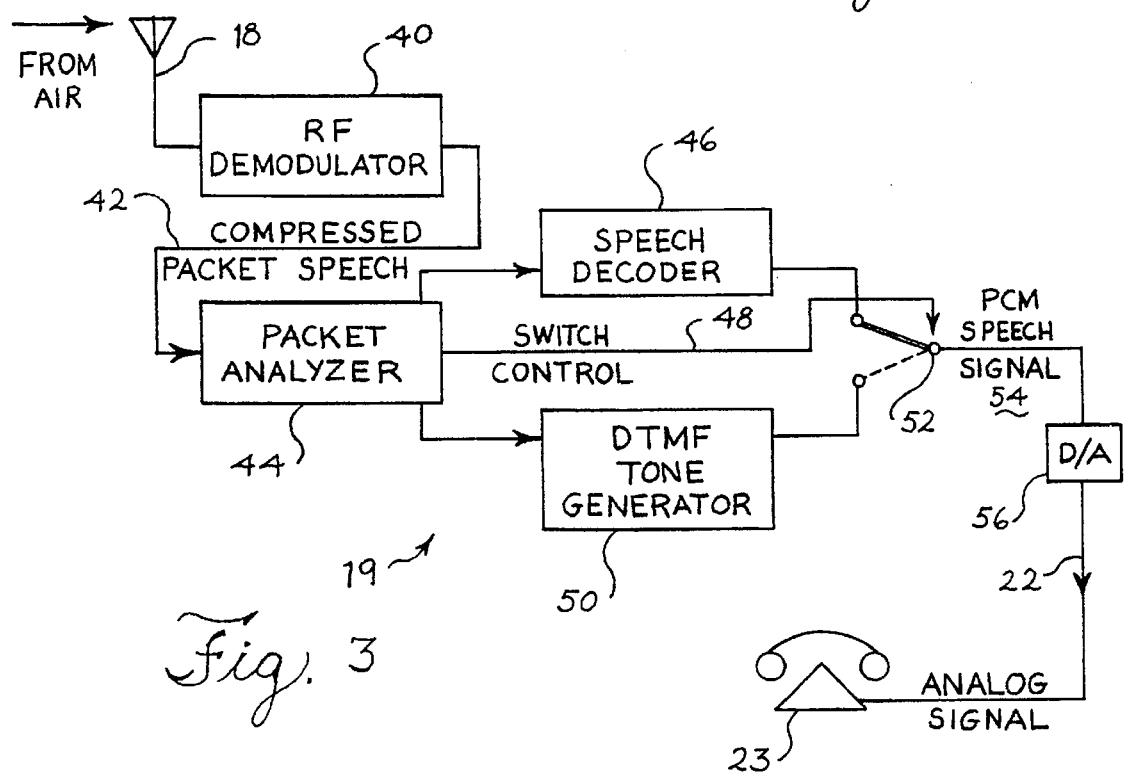
FIG. 3 is a block diagram of the tone generator of FIG. 1.

As shown in FIG. 3, a preferred embodiment of the receiver 19 includes an RF demodulator 40, a packet analyzer 44, a silence packet generator 45, a speech decoder 46, a first switch 49, a DTMF tone generator 50, a second switch 52, and a D/A converter 56. In the preferred embodiment, the RF demodulator 40 is connected to the packet analyzer 44, and the packet analyzer 44 is connected to the first switch 49 and to the second switch 52. The first switch 49 is also connected to the silence packet generator 45 and the speech decoder 46. The second switch 52 is preferably connected to the speech decoder 46, the DTMF tone generator 50, and the D/A converter 56.

The RF demodulator 40 receives an input signal, such as the modulated output signal from the transmitter 13, from the antenna 18 and generates a demodulated compressed packet signal 42. The packet analyzer 44 receives the packet signal 42 and analyzes the packet signal 42 for special tone packets. The packet analyzer 44 sends the compressed digital signal 42 to the speech decoder 46. When the packet analyzer 44 detects speech packets, the decoder 46 decompresses the compressed digital signal 42 and generates a digital PCM speech signal. When the packet analyzer 44 detects a DTMF tone packet, the speech decoder 46 preferably receives a silence packet, such as an all logical zero entry, from the silence packet generator 45. The speech decoder 46 generates silence instead of the digital PCM speech signal when receiving the silence packet.

When the packet analyzer 44 detects a special DTMF tone packet, the analyzer 44 recovers DTMF tone information including a key value and a tone duration value. The packet analyzer 44 sends the tone information to the tone generator 50, and the generator 50 transmits a PCM digital representation of the DTMF tone corresponding to the tone information. In the preferred embodiment, the packet analyzer 44 also sends a signal over a switch control line 48 to the first switch 49 to send a silence packet from the silence packet generator 45 to the speech decoder 46 and to the second switch 52 to send the tone generated by the DTMF tone generator 50 to the D/A converter 56. As a result, the output signal 54 includes both PCM speech from the speech decoder 46 and tone data from the DTMF tone generator 50. The digital output signal 54 is converted by the D/A converter 56 into an analog speech signal 22 sent to the second subscriber telephone 23.

Figure 4:
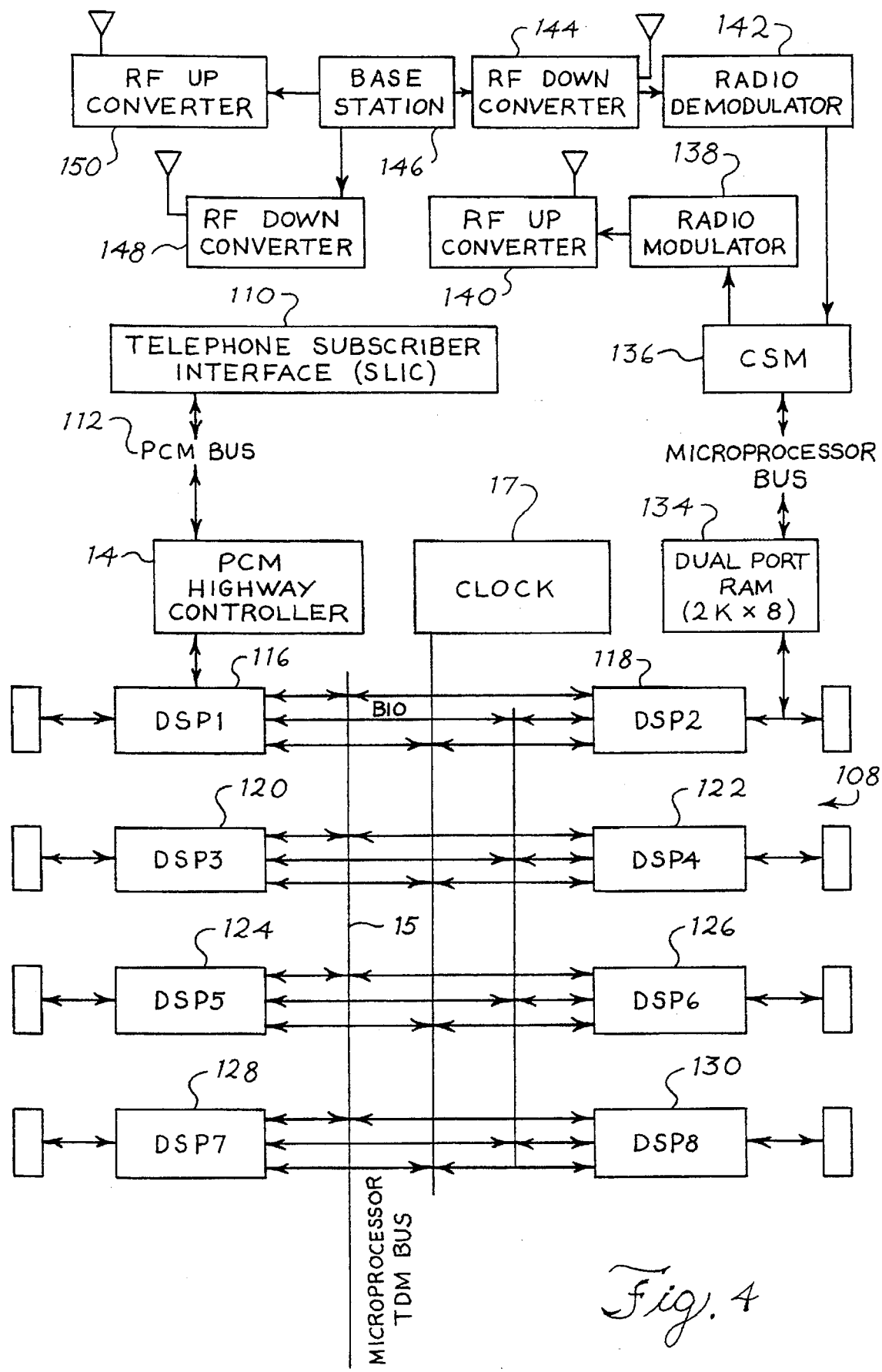
FIG. 4 is a block diagram of a transcoder module in a fixed wireless networking system according to a preferred embodiment of the invention.

FIG. 4 is a block diagram of a transcoder module 108 embodying the present invention. The transcoder 108 performs the functions of the transmitter 13 and the receiver 19 described above. The transcoder module 108 includes a telephone subscriber interface 110, a plurality of digital signal processors (DSPs) 116–130, a dual port RAM 134, a common switching module (CSM) 136, and an RF modulator 138. The plurality of DSPs may be programmed to perform a variety of functions. In a preferred embodiment, DSP1 116 functions as an input buffer 116, DSP2 118 functions as a DTMF tone detector and packet analyzer, and DSPs 3–8 120–130 perform digital compression and decompression. The telephone subscriber interface 110 communicates with the input buffer 116 over a PCM bus 112 and a PCM highway controller 114. The DSPs communicate with each other over a time division multiplexed (TDM) bus 115 and are synchronized by a clock 117. DSP2 118 communicates with the dual port RAM 134 which in turn communicates with the CSM 136. The CSM 136 communicates with the RF modulator 138, and an RF demodulator 142. The RF modulator 138 communicates with an RF upconverter 140, and the RF demodulator 142 communicates with an RF downconverter 144.

Each of the DSPs 116–130 are preferably ATY1610 type DSPs available from AT&T Microelectronics. The DSPs 116–130 may be programmed in the ATT1610 assembler programming language. The telephone subscriber interface 110 is an ALCN type interface available from Alcatel. The PCM bus 112, the PCM highway controller 114, and the TDM bus 115 is provided by the ATY1610 from AT&T Microelectronics. The clock 117 is preferably a 65.536 Mhz clock from Connor Winfield Corp, 2111 Comprehensive Dr., Aurora, Ill. The dual port RAM device 134 is preferably a 2K×8 IDT71421 RAM available from Integrated Device Technology, 3236 Scott Boulevard, Santa Clara, Calif. 95054. The RF section includes an RF modulator, an RF upconverter, an RF downconverter, and an RF demodulator as described in North American Digital Cellular Standard IS-54.

In a transmitting mode, the transcoder module 108 modulates and transmits digital data over the air using RF channels to a base station unit 146. The base station communicates with the transcoder module via an RF upconverter 150 and an RF downconverter 148. The digital data transmitted by the transcoder module 108 may include speech data, tone data, PCM data, compressed data, or any other type of data represented in digital form.

The telephone subscriber interface 110 preferably represents a plurality of subscriber telephones but may interface with a single analog telephone. As is well known in the art, when an individual speaks into the transmitting end of a telephone, an analog speech signal representing the individual's voice is created. PCM circuitry within the telephone subscriber interface 110 receives the analog speech signal and samples the analog speech signal at 8 Khz with 8 bits per sample creating a digital PCM speech signal having a 64 Kb/sec data transmission rate. The resulting digital PCM speech signal is preferably transmitted over the PCM bus 112. In a preferred embodiment where the telephone subscriber interface supports multiple subscribers, the PCM highway controller 114 multiplexes digital speech signals from multiple subscribers into a single digital signal that is stored in an input buffer 116. The input buffer area 116 preferably is implemented with a DSP such as DSP1116 which stores samples of the digital speech data and acts as a selective buffering device. The DSP1 116 also converts between the A-law PCM data used by the PCM highway controller 114 and a linear PCM signal used by the TDM bus 15.

The digital speech data is transmitted from DSP1 116 to DSP2 118 and then to a corresponding compression digital signal processor designated for the particular subscriber channel, e.g. DSPs 3–8 120–130. The DSP associated with the channel compresses the digital speech data into compressed speech packets and sends the packets to DSP2 118. Subsequently, DSP2 118 performs voice activity detection as well DTMF detection on the digital data received from DSP1 116.

If DSP2 118 detects the presence of voice data, the corresponding compressed speech packets received from the associated compression digital signal processor are transmitted to a dual port RAM device 134. The dual port RAM 134 acts as a data exchange buffer between the transcoder module 108 and the CSM 136. The CSM 136 is a high level controller receiving digital data from the dual port RAM 134 and transmitting data to the radio modulator 138 for transmission over the air via the RF upconverter 140. The transmitted data may be received by the RF downconverter 148 of the base station unit 146. The CSM 136 may allocate appropriate frequencies for communicating with the base station unit 146.

If DSP2 118 detects the presence of a DTMF signal, DSP2 preferably replaces the compressed speech packets with specially encoded DTMF packets to be sent over the air, such as to the base station unit 146. DTMF signals are present whenever a number or symbol is pressed on a subscriber telephone key pad on the subscriber telephone 12. Each number or symbol on the key pad is represented by a particular pair of frequencies, hence the name "dual tone." DTMF frequencies are specified by CCITT Q.24. Special coding by the transmitter, such as by sending a special tone packet, is necessary to allow the receiver to properly distinguish DTMF signals from other voice data.

Figure 5:
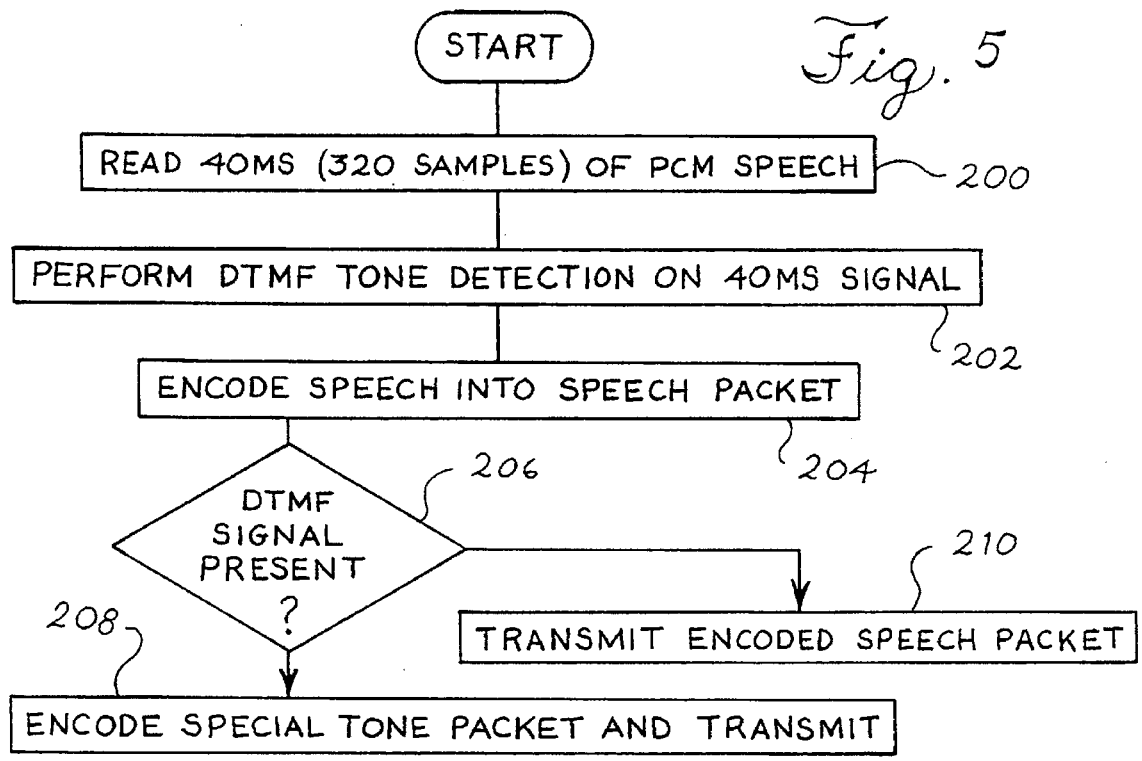
FIG. 5 is a flow chart illustrating a tone detection process according to a preferred embodiment of the invention.

FIG. 5 illustrates a preferred method of performing DTMF detection that may be executed on DSP2 118. As shown in FIG. 5, the tone detection process reads a 40 ms segment including 320 samples of PCM speech 200 and performs DTMF tone detection on the 40 ms segment 202. At 204, the 40 ms segment enters an encoding process. If a DTMF tone is present, as determined by a comparison 206, then a special tone packet is created and transmitted at 208. Otherwise, the 40 ms segment is encoded into a compressed speech packet to be transmitted 210.

Figure 6:
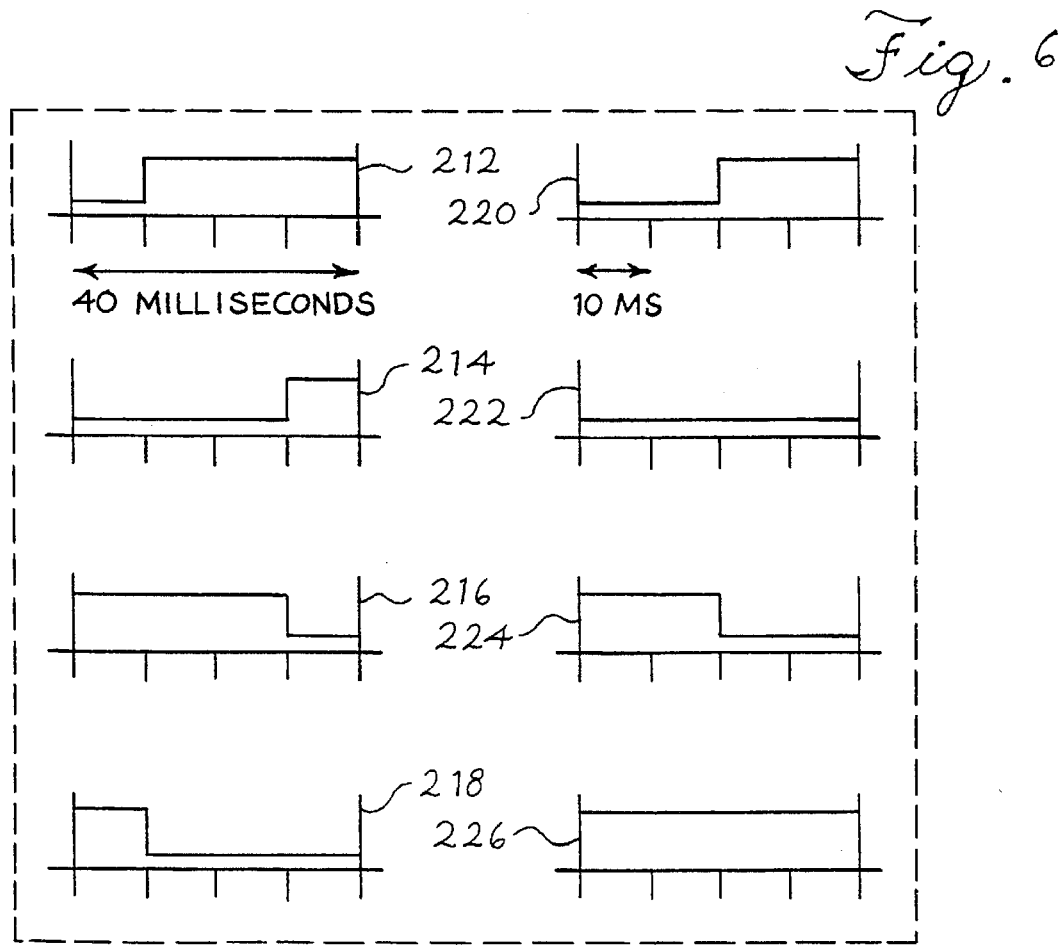
FIG. 6 is a diagram illustrating a method of encoding DTMF tone duration information.

Referring to FIG. 6, each 40 ms segment of speech is preferably further divided into four 10 ms sub-frames. Each sub-frame is preferably analyzed using digital Fourier transform (DFT) techniques for the presence of a valid DTMF tone. As shown in FIG. 6, there are eight possible DTMF tone duration combinations within the 40 ms segment 212–226. These eight DTMF tone duration combinations 212–226 are encoded using a 3 bit field in a DTMF tone packet. Also, as is known in the art, there are 16 valid DTMF digit combinations described herein as a key value. The DTMF key value may be encoded in a 4 bit field in the special DTMF tone packet.

In order to improve robustness in the DTMF digit detection process, several techniques have been developed. First, adherence to the CCITT Recommendation Q.24 requires that the received signal should be above 25 dbm, that the twist, the difference between the amplitudes of the pair of tones, should be within −8 to +4 dbm, and that the frequency deviation should be within 1.5%.

In addition, the preferred embodiment of the present invention uses a comparison of in-band energy to total energy. Since most of the signal's energy should be concentrated around the DTMF frequencies for a received DTMF tone, a ratio of in-band to total energy provides an excellent indicator of a DTMF tone.

In FIG. 7, an "ND" indicates no DTMF tone detected, and a "D" indicates a DTMF tone is detected in a received digital signal 228. For a detected DTMF digit, the energy ratio should exceed an energy threshold value for a contiguous string of 10 ms sub-frames 230. Each of the contiguous 10 ms DTMF sub-frames 230 should have the same DTMF key value. Also, the energy detected should not vary more than about 2 dB.

The DTMF detection process also determines whether the DTMF digit signals are preceded by a 50 ms silence interval. For example, if a 10 ms subframe indicates no digit detection followed by a 10 ms sub-frame in which a DTMF digit is detected, then the 40 ms segment before the first 10 ms subframe should be below a silence threshold, preferably 48 dbm. As shown in FIG. 7, a DTMF digit interval 232 is preceded by a silence interval 234 and each of these intervals include contiguous 10 ms subframes 230.

Although the preferred embodiment requires that each of the above conditions be satisfied before a DTMF digit is detected, the present invention is not limited to using all of these techniques. In applications allowing a lower degree of DTMF digit reception robustness, any of the above techniques or combination of techniques may be used but are not required.

In a receiving mode, the base station unit 146 may modulate compressed speech packets over the air via an RF up converter 150 to the RF down converter 144 of the multisubscriber transcoder unit 108. The CSM 136 receives compressed speech packets and transmits the packets to the dual port RAM 134 acting as a data exchange buffer between the base station unit 146 and the CSM 136.

DSP2 118 searches for the presence of compressed speech packets in the dual port RAM 134. When DSP2 118 receives compressed packets, they are sent to one of the decompression digital signal processor, such as one of DSPs 3–8 120–130. Preferably, each of the decompression DSPs 120–130 are assigned to decompress speech signals routed to particular telephone subscribers so that load balancing occurs among the decompression DSPs 120–130. The assigned decompression DSP decompresses the packets into PCM speech data and sends the PCM speech data to DSP1 116. DSP1 116 transmits the PCM data to the telephone subscriber interface 110 where a D/A converter using an 8 Khz clock reconstructs an analog speech signal.

The DSP2 118 performs at least some of the functions of the packet analyzer 44 described above. Specifically, when the DSP2 118 detects a special DTMF tone packet from the received signal, the DSP2 118 commands DSP1 116 to generate a specific tone. DSP1 116 then replaces the PCM data from the decompression DSP 120–130 with PCM tone data corresponding to the received tone information. An output signal including PCM speech and tone data is then transmitted to the telephone subscriber interface 110 where the D/A converter reconstructs the analog signal.

A preferred DTMF tone generation process that may be executed in the DSP2 118 and DSP1 116 is shown in FIG. 8. First, the tone generation process reads a single packet 300 and determines whether the packet is a special tone packet 302, 304. If the packet is a tone packet, the decoder state is cleared by feeding a compressed value of silence to the decoder 306, and 320 samples of PCM data for the DTMF digit corresponding to the tone packet is generated at 308. Otherwise, the decoder decompresses the speech packet and creates 320 samples of PCM speech signal to be sent to a subscriber. The decoder preferably corresponds to one of the decompression DSPs 120–130 described above.

FIG. 9 shows a preferred embodiment of a tone packet 312. The tone packet 312 includes a plurality of fields including a header field 314, a duration field 316, and a key field 318. Each duration field 316 preferably has seven 3 bit subfields 320. Each of the key fields 318 preferably has seven 4 bit subfields 322. Although the tone packet 312 as shown is 200 bits long, the tone packet 312 may be any other length as long as the key 318 and duration 316 information may be reliably detected by the receiver. Preferably, the tone packet 312 is the same length as a compressed speech packet, allowing easy replacement of a compressed speech packet with a tone packet 312.

The fields in the tone packet 312 are preferably formatted for improved DTMF digit recovery. During transmission, the header field 314 is preferably coded with 64 bits each having a logic "1" value. Preferably, the tone generator examines the header field 314 for the occurrence of a predetermined number, preferably at least 60, logic "1" bits when detecting the tone packet 312. The following bits of the tone packet 312 are then examined. If at least a majority, and preferably 5, of the 7 3-bit duration combinations match, the duration combination value from the matching duration subfields 320 is selected. If at least a majority, preferably 5, of the 7 key field 4 bit combinations match, then the key represented by the 4 bit field 322 is selected. A DTMF tone generator may generate a DTMF tone based on the detected key value and tone duration value.

Additional advantages and modifications will readily occur to those skilled in the art. The invention, in its broader aspects, is therefore not limited to the specific details, representative apparatus, and illustrative examples shown and described. Various modifications and variation can be made to the present invention without varying from the scope or spirit of the invention, and it is intended that the present invention cover the modifications and variations provided they come within the scope of the appended claims and their equivalents.

What is claimed is:

1. An apparatus for sending and receiving digital signals in a voice communication system comprising:
    a data buffer for receiving and storing a digitized signal from a single subscriber including voice band tone data and speech data;
    a tone detector for detecting said voice band tone data and generating at least one tone packet containing data indicative of said voice band tone data;
    a speech encoder for encoding said speech data into a plurality of compressed speech packets; and
    a transmitting unit in communication with said tone detector and said speech encoder for transmitting a packet message including said tone packets and said speech packets over an RF channel, said tone packets being interleaved with at least one of said speech packets.

2. An apparatus for sending and receiving digital signals in a voice communication system comprising:
    a data buffer for receiving and storing a digitized signal including voice band tone data and speech data;
    a tone detector for detecting said voice band tone data and generating at least one tone packet containing data indicative of said voice band tone data, wherein said tone packet comprises a header field, a duration field, and a key field;

a speech encoder for encoding said speech data into a plurality of compressed speech packets; and a transmitting unit in communication with said tone detector and said speech encoder for transmitting a packet message including said tone packets and said speech packets over an RF channel.

3. The apparatus of claim 2, wherein said header field includes a distinguishable binary sequence.

4. The apparatus of claim 2, wherein said duration field includes a plurality of duration combination subfields.

5. The apparatus of claim 2, wherein said voice band tone data comprises DTMF digits and said key field includes a plurality of key subfields, at least one of said subfields containing data indicative of said DTMF digits.

6. The apparatus of claim 1, Wherein said tone packets have the same length as said speech packets.

7. An apparatus for sending and receiving digital signals in a voice communication system comprising:

a data buffer for receiving and storing a digitized signal from a single subscriber including voice band tone data and speech data;

a tone detector for detecting said voice band tone data and generating at least one tone packet containing data indicative of said voice band tone data;

a speech encoder for encoding said speech data into a plurality of compressed speech packets;

a transmitting unit in communication with said tone detector and said speech encoder for transmitting a packet message including said tone packets and said speech packets over an RF channel;

a decoder adapted to receive said packet message including:

a speech decoder for detecting said speech packets and decompressing said speech packets to generate a digitized speech signal; and a tone generator for detecting said tone packets and generating a digitized voice band data tone signal from said data indicative of said voice band tone data.

8. An apparatus for sending and receiving digital signals in a voice communication system comprising:

a data buffer for receiving and storing a digitized signal including voice band tone data and speech data;

a tone detector for detecting said voice band tone data and generating at least one tone packet containing data indicative of said voice band tone data;

a speech encoder for encoding said speech data into a plurality of compressed speech packets;

a transmitting unit in communication with said tone detector and said speech encoder for transmitting a packet message including said tone packets and said speech packets over an RF channel;

a decoder adapted to receive said packet message including:

a speech decoder for detecting said speech packets and decompressing said speech packets to generate a digitized speech signal; and a tone generator for detecting said tone packets and generating a digitized voice band data tone signal from said data indicative of said voice band tone data, wherein said tone generator detects a tone packet by examining a header field or said tone packet.

9. The apparatus of claim 8, wherein said header field contains sixty-four bits and said tone generator examines said header field for the occurrence of at least sixty logic one bits.

10. An apparatus for sending and receiving digital signals in a voice communication system comprising:

a data buffer for receiving and storing a digitized signal including voice band tone data and speech data;

a tone detector for detecting said voice band tone data and generating at least one tone packet containing data indicative of said voice band tone data;

a speech encoder for encoding said speech data into a plurality of compressed speech packets;

a transmitting unit in communication with said tone detector and said speech encoder for transmitting a packet message including said tone packets and said speech packets over an RF channel;

a decoder adapted to receive said packet message including:

a speech decoder for detecting said speech packets and decompressing said speech packets to generate a digitized speech signal; and a tone generator for detecting said tone packets and generating a digitized voice band data tone signal from said data indicative of said voice band tone data, wherein said tone generator determines a tone duration value by examining said duration field.

11. The apparatus of claim 10, wherein said duration field contains a plurality of three-bit duration combination subfields, and said tone generator examines said duration field for the occurrence of at least a majority of said three-bit duration combination subfields having the same value.

12. An apparatus for sending and receiving digital signals in a voice communication system comprising:

a data buffer for receiving and storing a digitized signal including voice band tone data and speech data;

a tone detector for detecting said voice band tone data and generating at least one tone packet containing data indicative of said voice band tone data;

a speech encoder for encoding said speech data into a plurality of compressed speech packets;

a transmitting unit in communication with said tone detector and said speech encoder for transmitting a packet message including said tone packets and said speech packets over an RF channel;

a decoder adapted to receive said packet message including:

a speech decoder for detecting said speech packets and decompressing said speech packets to generate a digitized speech signal; and a tone generator for detecting said tone packets and generating a digitized voice band data tone signal from said data indicative of said voice band tone data, wherein said tone packet comprises a key field including a plurality of four-bit key subfields, and said tone generator examines said key field for the occurrence of at least a majority of said four-bit key subfields having the same value.

13. A method of encoding a digital signal comprising the steps of:

receiving a digital signal from a single subscriber, said digital signal having a speech component and a digit component;

detecting digit information from said digit component;

generating a plurality of tone packet signals including said digit information;

generating a speech packet signal by compressing said speech component; and generating a digital output signal including said speech packet signal and said tone packet signals, said tone packet signals being interleaved with said speech packet signal.

14. The method of claim 13, further including the step of transmitting said digital output signal over a common communication channel.

15. The method of claim 14, wherein said common communication channel is associated with an RF frequency.

16. The method of claim 14, further including the steps of:

receiving said digital output signal transmitted over said common communication channel;

recovering said digit information from said tone packet signals; and decoding said speech packet signal generating a digitized speech signal.

17. The method of claim 16, further including the steps of:

generating a digitized tone signal representative of said digit information; and generating a decompressed output signal including said digitized speech signal and said digitized tone signal.

18. The method of claim 17, wherein said digitized tone signal comprises a DTMF signal.

19. A method of decoding a compressed digital signal comprising the steps of:

receiving a compressed digital signal including a plurality of tone and speech packets from a single subscriber, said tone packets being interleaved with at least one of said speech packets;

detecting the packet type for each of said plurality of packets; and decoding each of said speech packets generating a digital speech signal.

20. The method of claim 19, further including the step of generating a digital tone signal from said tone packets.

21. The method of claim 20, wherein said digital tone signal comprises pulse code modulated samples of a DTMF digit.

22. A method of decoding a digital signal comprising the steps of:

receiving the digital signal from a single subscriber, said digital signal including a speech packet signal and a plurality of tone packet signals, said tone packet signals being interleaved with said speech packet signal;

decoding said speech packet signal to generate a speech component;

recovering tone information from said tone packet signal;

generating a tone component from said tone information; and generating an output signal including said tone component and said speech component.

* * * * *